United States Patent [19]

Papa

[11] Patent Number: 5,333,955
[45] Date of Patent: Aug. 2, 1994

[54] AUTOMOTIVE MAIN BEARING

[76] Inventor: George M. Papa, 57 North Fraser Dr., Mesa, Ariz. 85203

[21] Appl. No.: 3,005

[22] Filed: Jan. 11, 1993

[51] Int. Cl.⁵ .......................... F16C 33/10; F01M 1/00
[52] U.S. Cl. .................. 384/291; 123/196 R; 384/292; 384/288
[58] Field of Search ............. 384/286, 287, 288, 291, 384/292; 123/196 R

[56] References Cited

U.S. PATENT DOCUMENTS

| | | | |
|---|---|---|---|
| 1,121,904 | 12/1914 | Doehler | 384/292 |
| 2,004,254 | 6/1935 | Taub | 384/288 |
| 2,544,913 | 3/1951 | Brantingham | 384/288 |
| 2,673,767 | 3/1954 | Schoeppner | 384/291 |
| 2,901,297 | 8/1959 | Sternlicht | 384/291 |
| 3,965,880 | 6/1976 | Michael | 384/292 X |
| 4,105,267 | 8/1978 | Mori | 384/291 |

Primary Examiner—Thomas R. Hannon
Attorney, Agent, or Firm—Michael I. Kroll

[57] ABSTRACT

A main bearing for an internal combustion engine includes a top half and a bottom half joined along edges to from a sleeve for surrounding a main bearing of a crankshaft. A pair straight recesses, parallel to the bearing axis and the joining edges, are disposed on an internal surface of the bottom half of the bearing so that oil can puddle there, capture debris, and prevent dry starts of the internal combustion engine. A separate set of oppositely angled grooves are disposed on the internal surface of the bottom half of the bearing and outside the pair of straight recesses. The first angled groove removes excess oil from the front or back of the bearing and the second angled groove returns sufficient oil to maintain adequate surface bearing lubrication.

1 Claim, 2 Drawing Sheets

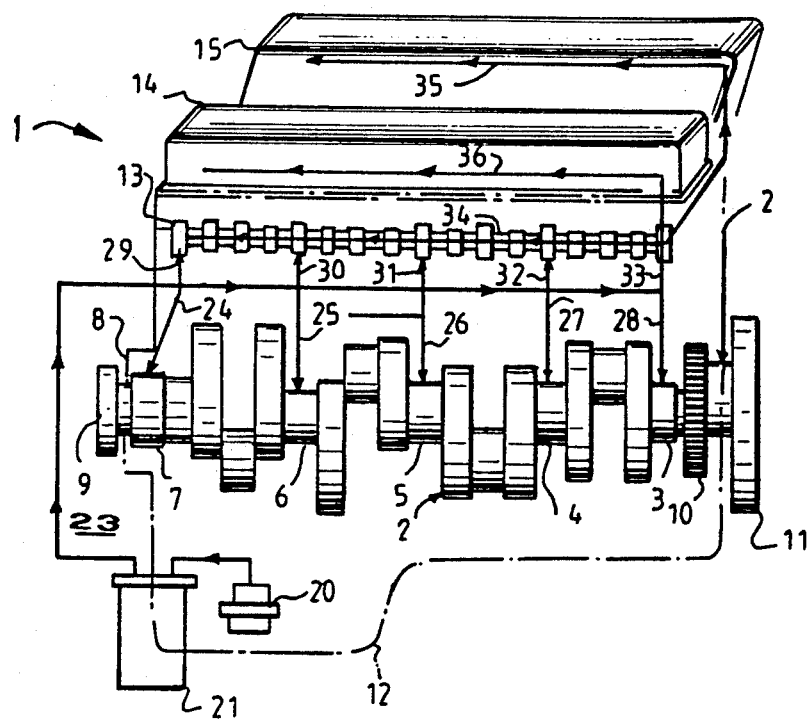
Fig.1
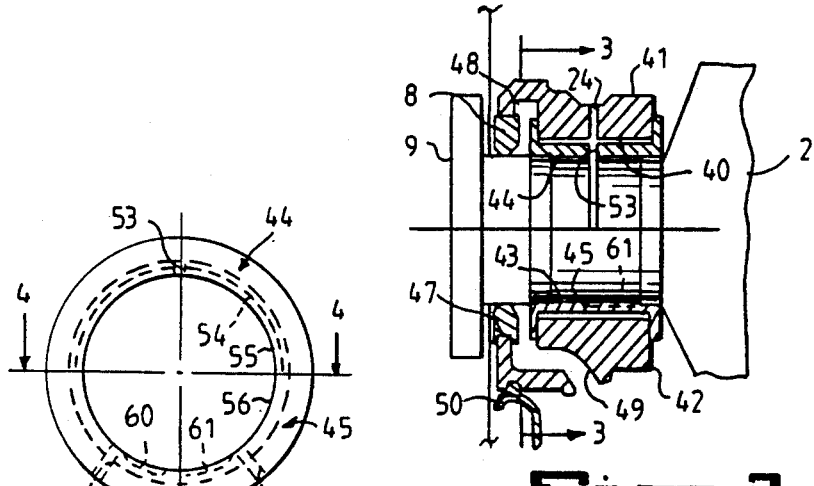
Fig.2 (PRIOR ART)
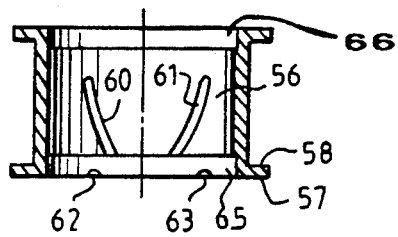
Fig.3 (PRIOR ART)
Fig.4 (PRIOR ART)

AUTOMOTIVE MAIN BEARING

BACKGROUND OF THE INVENTION

1. Field of the Invention

The present invention relates to a bearing.

More particularly, the present invention relates to each main bearing of an automotive set.

2. Description of the Prior Art

Internal combustion engines, whether two or four cycler include one or more reciprocating pistons attached to a crankshaft through connecting rods. The crankshaft, in combination with the connecting rods, translates the reciprocal motion of the piston into a rotary power output. The rotary movement of the crankshaft is transmitted directly or through gear means to drive an element, such as the rear wheels of an automobile. The crankshaft is supported by at least a front and a rear main bearing and one or more intermediate main bearings, depending upon the length of the crankshaft, the power output, and other factors. Each of these main bearings must be of relatively close tolerance and well lubricated to withstand the applied forces and minimize friction and wear.

The crankshaft extends through an aperture within the engine wall in proximity to the rear main bearing for attachment to a flywheel or the like. A rear main seal is disposed intermediate the engine wall and the protruding crankshaft to prevent oil seepage therebetween.

In conventional internal combustion engines, an annular space exists intermediate the rear main seal and the rear edge of the rear main bearing. This space, in combination with a return passageway to the oil sump, provides a means for collecting the oil outflow rearwardly from the rear main bearing and returning it to the oil sump. With the almost exclusive present use of full pressure lubricating systems in automobile engines and the high ambient oil pressures, the annular space and associated passageway adjacent the rear main seal is generally inadequate in preventing a high pressure buildup in proximity to the rear main seal. The high pressure buildup in combination with the force of the oil outflowing from the rear main bearing tend to deteriorate and deform the rear main seal, resulting in oil leakage therethrough.

FIG. 1 is a schematic representation of a full pressure lubrication system disposed within an automotive internal combustion engine 1. A crankshaft 2 is mounted within the block of the internal combustion engine 1 by means of front main bearing 3, main bearings 4, 5, and 6 and rear main bearing 7. The crankshaft 2 extends rearwardly of internal combustion engine 1 through a rear main seal 8 and terminates at a radial flange 9. Crankshaft 2 also includes connecting rod bearings 3a, 4a, 5a, and 6a. The front of the crankshaft 2 may include a timing gear 10 and may extend forwardly of the engine to support one or more pulleys 11. The open bottom part of the block is Covered by a downwardly extending pan 12, which pan 12 also serves as an oil sump. A chain or gear driven cam shaft 13 is disposed within the block above the crankshaft 2. The camshaft supports a plurality of push rods, which push rods act through a rocker assembly to open and close the valves. The rocker assembly or assemblies are housed within one or more valve covers 14 and 15.

An oil pump 20, normally housed within pan 12, has an oil pickup disposed within the oil sump. The oil pump pumps the oil through a filter 21 into main oil gallery 22. The main oil gallery feeds oil to each of the main bearings through oil lines 24, 25, 26, 27, and 28. A plurality of passageways are generally disposed within crankshaft 2 to distribute oil from the main bearings to the bearings intermediate the crankshaft 2 and the connecting rods. Additional oil lines 29, 30, 31, and 32 supply oil to the camshaft bearings. A passageway 33 distributes oil to the valve lifter oil gallery 34 and rocker arm oil galleries 35 and 36. Oil return to the oil sump is effected by drainage through various passageways.

Automotive internal combustion engines 1 of a few years ago were designed to operate at low rpm with high torque at low rotational speed. For those internal combustion engines 1 which used full pressure lubrication systems, the oil pump pressure was generally in the vicinity of twenty pounds per square inch and ranged up to thirty pounds per square inch in rare instances. Recent modifications of internal combustion engine ,1 design criteria have caused the internal combustion engines 1 to operate at substantially increased rpm and high tolerances. In order to obtain adequate lubrication under these operating parameters, the oil pressure has been increased to the vicinity of forty pounds per square inch. The increase in oil pressure, while necessary to adequately lubricate the internal combustion engine 1, has created problems in obtaining adequate and long lasting oil seals. One such troublesome seal has been the rear main seal 8.

Referring now to FIG. 2, the operation and elements are described. The underlying support for the rear main bearing of crankshaft 2 is provided by a cylindrical depression 40 disposed within the corresponding part of block 41 of internal combustion engine 1. A bearing cap 42, having a mating semi-cylindrical depression 43, is bolted to block 41, to retain the crankshaft 2 and rear main bearing 7 therebetween. A pair of mating radially flanged semi-cylindrical bearings 44 and 45 are seated within depressions 40 and 43, respectively, with the radial flanges preventing axial or longitudinal displacement of the bearings.

The rear main seal 8 is retained within a mating circular aperture 47, disposed within the rear wall of internal combustion engine 1 to encircle the protruding part of crankshaft 2. As mentioned above, the purpose of the rear main seal 8 is that of preventing oil flow adjacent the surface of the protruding part of the crankshaft 2.

An annular cavity 48 is disposed about crankshaft 2 intermediate the rear radial flanges of bearings 45 and 46 and the rear main seal 8. A passageway 49 interconnects the annular cavity with the oil sump to permit oil drainage into the sump from the annular cavity. Oil pan 12 is bolted or otherwise secured to the lower surface of block 41 with an intermediate seal 50.

Normally, lubrication for the rear main bearing is provided by oil flow through oil line 24 within block 41, which oil line terminates coincident with an aperture 53 extending through bearing 44. A slot 54 is disposed within the inner surface 55 of bearing 44 to distribute the oil inflowing through slot 53 intermediate the bearing and the bearing surface of crankshaft 2. By well known hydraulic principles, the oil disposed within slot 54 will be distributed intermediate the inner surfaces of both bearings 44 and 45 and the corresponding bearing surfaces of crankshaft 2. The normal oil outflow from bearings 44 and 45 will be forwardly and rearwardly along the crankshaft 2. The oil flowing forwardly will ultimately drip into the oil sump. The oil flowing rearwardly, will tend to strike rear main seal 8 and collect within annular cavity 48 with drainage therefrom occurring through passageway 49.

As shown in FIGS. 2, 3, and 4, in earlier internal combustion engines 1 having oil pressures in the range of twenty pounds per square inch, the force of the oil outflowing rearwardly from the rear main bearing 7 had a low velocity and was low in volume. However, when the oil pressure was increased to forty pounds per square inch without redesigning the lubrication system in proximity to the rear main bearing 7, the outflowing oil acquired sufficient force to damage and cause deterioration of rear main seal 8. Moreover, the increased volumetric flow exceeded the oil collection and discharge capability of the annular cavity 48. Hence, a high pressure environment was created within the annular cavity and placed a strain upon the rear main seal 8.

By forming one or more forwardly extending shallow depressions or channels 60 and 61 in inner surface 56 of lower bearing 45, passageways are established to induce forward flow of oil from the lower bearing 45. The forward flow of the oil relieves the pressure buildup within annular cavity 48 and reduces both the volume and velocity of the rearwardly flowing oil. In internal combustion engines 1 where the forward surface 57 of flange 58 abuts a planar surface of crankshaft 2, a relief must be provided to permit oil flow therebetween. Such a relief is accommodated by means of a pair of radially extending depressions 62 and 63.

It may also be pointed out that by limiting the length of channels 60 and 61, such that they extend inwardly (longitudinally) from the forward edge of the bearing surface to a point short of the rear edge of the bearing surface, no reduction in lubrication or the quality thereof has been experienced. The number of channels and their orientation may, of course, vary depending upon the ambient oil pressure, the viscosity of the oil and the bearing tolerances. However, it has been learned that for most popular cars manufactured in America, two channels disposed in opposite sides of the lower bearing and extending across approximately four-fifths of the bearing surface and angled toward the low point of the bearing surface has produced very satisfactory results. Moreover, the width of the channels may be on the order of ⅛ of an inch and their depth may range from one thousands to ten thousands of an inch. The exact and preferred dimensions will vary with the type and nature of the bearing in conjunction with the nature of the existing lubrication system.

It may be noted that the annular depressions 65 and 65' are a function of the bearing design and do not form a part of the bearing surfaces (54, 56).

After an internal combustion engine 1 without modified rear main bearings has been shut off, there may exist a pressure buildup within the oil distribution system for varying periods of time, dependent to a great extent upon the amount of sludge in the oil, constrictions within return passages and the tolerance between the parts wherethrough the oil must flow. At the rear main bearing 7, it is not unusual to have a substantial pressure buildup intermediate the rear main bearing 7 and the corresponding bearing surface of the crankshaft 2 and within the annular cavity for a substantial period after the oil pump has ceased to operate. The slowly decaying pressure environment tends to cause oil seepage intermediate the rear main seal 8 and the crankshaft 2. In many cases, this pressure environment is responsible for the oil drips which occur after a car is parked.

If channels 60 and 61 are employed, there will occur an almost immediate complete pressure relief within the rear main bearing 7 after the internal combustion engine 1 is shut off. Hence, there is only a short period lingering pressure environment within the rear main bearing and the adjacent annular cavity.

Numerous innovations for automotive rear main bearings have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a bearing.

More particularly, it is an object of the present invention to improve upon the existing art of the prior invention by incorporating additional advantages as shall be shown, while at the same time retaining the advantage of the prior art.

In keeping with these objects, and with others which will become apparent hereinafter, one feature of the present invention resides, briefly stated, in a rear main bearing for an internal combustion engine, including, a top half having a front edge, a back edge, an internal surface, a first end and a second end, a bottom half having a front edge, a back edge, an internal surface, a first end and a second end, the bottom half meets the top half so that the first end of the top half joins the first end of the bottom half and the second end of the top half joins the second end of the bottom half, and at least one recess disposed on the internal surface of the bottom half of the bearing so that oil can puddle there, collect debris, and prevent dry starts of the internal combustion engine.

Still another feature of the present invention is that the means is a single straight recess disposed on the internal surface of the bottom half of the bearing parallel to the first and second ends and ending prior to meeting the front edge and the back edge of the bearing.

Yet still another feature of the present invention is that the means is a single straight recess disposed on the internal surface of the bottom half of the bearing parallel to the first and second ends and ending at the front edge and the back edge of the bearing.

Still yet another feature of the present invention is the option of having the means be at least two or more straight recesses disposed on the internal surface of the bottom half of the bearing parallel to the first and second ends and ending prior to meeting the front edge and the back edge of the bearing.

Another feature of the present invention is the option of having the means be at least two or more straight recesses disposed on the internal surface of the bottom half of the bearing parallel to the first and second ends and ending prior to meeting the front edge and the back edge of the bearing.

Another feature of the present invention is the option of having the means further including two straight recesses disposed at an angle to and meeting the front or back edge of either the upper half or the lower half of the bearing and stopping prior to the back or front edge of either the upper half or the lower half of the bearing and disposed such that the one or more straight recesses lie in conjunction with the angular recesses, respectively.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a schematic illustration of a representative oil distribution system within an automotive internal combustion engine;

FIG. 2 is a cross-sectional view of a rear main bearing constructed in accordance with the teachings of the prior art and a conventional rear main seal;

FIG. 3 is an end view of a rear main bearing of the prior art;

FIG. 4 is a top view of a rear main bearing of the prior art, taken along line 4—4 of FIG. 3;

DETAILED DESCRIPTION OF THE PREFERRED EMBODIMENT

Figure 5:
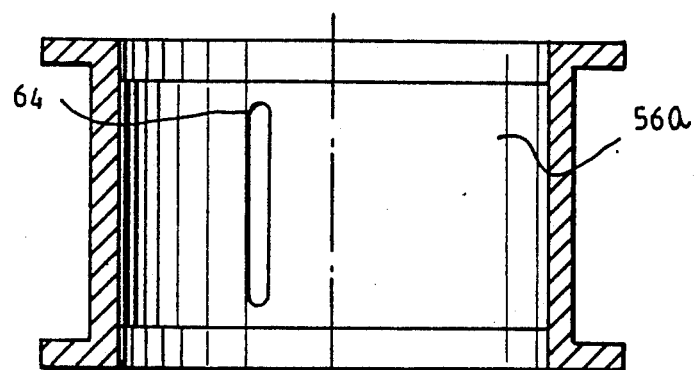
FIG. 5 is a top view of one embodiment of the rear main bearing of the present invention.
Figure 6:
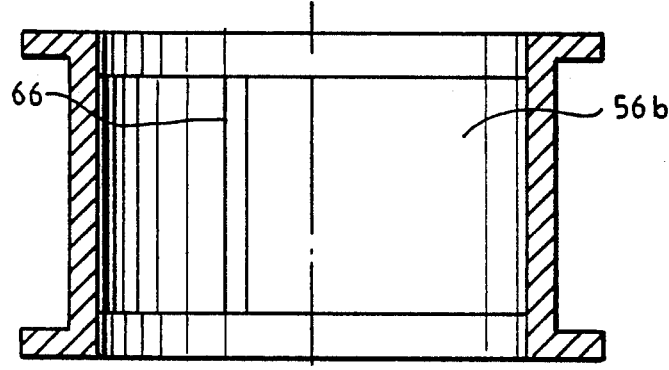
FIG. 6 is a top view of a second embodiment of a main bearing of the present invention.
Figure 7:
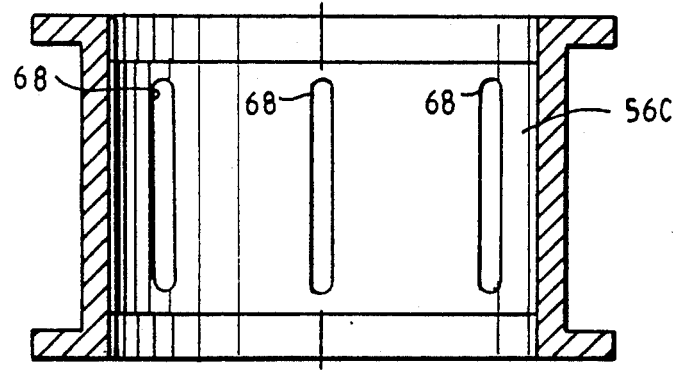
FIG. 7 is a top view of a third embodiment of main bearing of the present invention.

Bearings are stationary supports which carry a moving element of a machine and maintains the proper relationship of the moving element to the stationary element. The most common form is the support of a revolving shaft. A bearing usually allows the moving element perfect freedom for one form of motion, such as rotation, and at the same time prevents any other form of motion. The contacting surfaces between the moving and stationary elements offer more or less resistance to motion, and are customarily separated by a film of oil for antifriction purposes.

Sliding bearings, not roller bearings, are the object of this invention. Three types of sliding motion are in common use: (1) reciprocal motion where an object slides back and forth across the bearing surface; (2) rotation in journal bearings; and (3) thrust loads on a rotating shaft such as those supporting bevel gears, worm gears, propellers, fans, etc.

Journal bearings for the support of revolving shafts are in common use. Essentially the shaft revolves inside a circular housing which has a lining of alloy bearing metal. This liner which may consist of Babbitt metal backed by bronze, is often called a "brass". There is enough clearance between the shaft and the bore of the bearing metal to allow for a lubrication film and expansion of the shaft by frictional heat generated during operation.

Automotive bearings support crankshafts, connecting rods, wrist pins, camshafts, and other shafts. Thin layers of bearing metal alloy are used, backed by bronze or copper and supported by steel.

This invention stakes no claim regarding the exclusivity of any material used to construct the bearing, be it of alloy material, brass, bronze, copper, aluminum, babbit metal or any combination thereof, etc. This invention is designed to be adapted to all bearing construction material common to the industry.

The locations for five main bearings 3, 4, 5, 6, and 7 are shown in FIG. 1.

By reversing the angle direction of the grooves 60 and 61 of the rear main bearing 7 instead of creating a low pressure area that channels and diverts the oil away from the rear main seal 8. It actually does the reverse and directs the oil to the rear main bearing 7.

The reason for this is because some newer bearings 7 are "flange type" bearings, which feature a joint thrust bearing in that position in conjunction with the actual rear main bearing 7. These types of configurations can make it desirable for more, not less, oil to be directed in that area in order to keep the thrust bearing lubricated. Also, some of the new materials and designs for the rear main seal 8 itself are such that it is also desirable for more not less oil to be channeled into the rearward area instead of the forward area.

Not all internal combustion rear main bearings 7 are of this type. The more common and existing rear main bearings 7 of the industry are invariably smooth on the contact surface 56 with the crankshaft 2 and thus they simply rely or fall on the random pattern of the oil flow on the rear main bearing 7, as it is affected by the spin of the crankshaft 2 on the surface 56 of the rear main bearing 7.

Regardless of the "flange" aspect of the rear main bearing 7 the other main bearings 3, 4, 5, and 6 of the internal combustion engine 1, apart from, but not excluding, the single no. 7 rear main bearing, are the recipients of the one or more "straight line" grooves that go partially, or all the way, through the bearing surface 56 either at, or before and after the bottom apex of the full weight of the crankshaft 2 on the main bearings 3, 4, 5, 6, and 7.

FIG. 4 of the prior art rear main bearing 7 shows that only the bottom half face 56 of the rear main bearing 7 is affected by the grooving 60 and 61. Oil is introduced at the top of the rear main bearing 7 through a small circular port, whereupon the oil rotates in a circle.

The intent of the embodiment of grooves 64, 66, 8, 72, or 73 of the present invention 67, 67a, 67b, and 67c, shown in FIGS. 5, 6, 7, and 8, respectively, is to do two things, (1) create a "puddle" of collectable oil before that crucial location (FIG. 5) that will increase and enhance the introduction of oil to that highest friction area, and (2) create a trough 64 where grit and small debris in the oil will fall into, and no longer be effective in terms of being a continuing abrasive on the otherwise smooth bearing surface 56a.

This groove 64 may or may not extend all the way through either side of the rear main bearing 7. See FIG. 6.

If the groove 66 is extended all the way through either bearing surface 56b (FIG. 6) then the grit removal factor would be greater, because then the grit would be completely washed out and not be retained in the groove 66 at all. This may or may not adversely effect the primary aspect of introducing more, not less, oil to that crucial location. For sure, the oil would be constantly replenished with fresh oil under pressure from the top oil port, that introduces oil to the rear main bearing 7 in the first place.

In terms of any grooving for the bearings, including angular grooving, it needs to be "all encompassing"T such that multiple grooves may be installed at any location across the full face of the bearings, including the top half of the bearing, not just the bottom half face, particularly for the "rear" main bearings 7.

The value of this grooving, is that it also solves the problem of oil starvation and thus critical friction concern during the first few rotations of the crankshaft 2, during a "restart" of a "cold" internal combustion engine 1 is reduced.

During this momentary "start-up" phase, the oil has been "drained" from the surface area, and will not be replenished until pressure from a running internal combustion engine 1 is reestablished, and oil is again pumped to the bearing surface 56 through the top half oil port. By this time, the crankshaft 2 has already turned over a few times on a "dry" bearing contact surface 56, causing undue friction wear.

By inserting even a single "pocket" 64 (see FIG. 5); or perhaps an all encompassing "set" of pockets 68 along the bearing surface 56a and 56c, (see FIG. 7), then a "puddle" of oil is already trapped in place in each pocket 68, to be later picked up by the crankshaft 2 when it begins to turn, and thus provide protection from friction the moment the crankshaft 2 begins to rotate. In addition, a crevice is created to trap any debris particles that might flow through the oil film. Of course the ultimate intent here is to simply extend the life and the efficiency of the main bearings 3, 4, 5, 6, and 7.

Each internal combustion engine 1 has several main bearings 3, 4, 5, 6, and 7 that are in alignment to support the engine crankshaft 2. However, only the most rearward bearing is known as the "rear" main bearing 7. This particular bearing 7 is at the aperture of the internal combustion engine 1, where the crankshaft 2 protrudes out of the internal combustion engine 1 itself to connect to the transmission. It is at this crucial point of the internal combustion engine 1 that oil, under intense internal engine pressure, notoriously leaks out of the internal combustion engine 1 to cause not only oil loss, but messy driveway splotches, etc. The formidable task of the "rear main seal" 8 is to try to arrest those leaks which escape past the rear main bearing 7.

A standard V-8, engine has 5 main bearings 3, 4, 5, 6, and 7. These five bearings, which are at intervals along the crankshaft 2, serve only two purposes. One is to support and stabilize the crankshaft 2. Two is to do this task with a minimum amount of friction and engine wear, given that the crankshaft 2 is rotating at very high speed as it is cradled in the bearings 3, 4, 5, 6, and 7.

Each bearing 3, 4, 5, 6, and 7 forms a complete circle (top-half bottom-half) around the crankshaft 2. A hole at the top of the bearings 3, 4, 5, 6, and 7 injects the oil, which then spins around the entire bearing surface by the rotation of the crankshaft 2, to solve the friction problem. By centrifugal force, oil escapes at random in any direction from any front or back edge of bearing 3, 4, 5, 6, and 7. It is the uncontrolled backward escape of oil from the rear main bearing 7, that is subject to escaping past the rear main seal 8 and falling on the ground.

It is this aspect of preserving the controlled directional flow of oil, relative to the rear main bearing 7, that is the present invention. In addition, one more aspect of improvement is critical, for all of the bearings 3, 4, 5, and 6, including the rear main bearing 7. This new design also establishes and maintains an improved "oil bed" for better lubrication purposes, and also to act as a cleansing agent, within the bearing surface itself. An additional claim for groove 70, as shown in FIG. 8, is that debris that arrives in the oil is "flushed out" of that bearing surface 56d.

An additional claim relative to the continued employment of the angular grooves 70 and 74 on the bearing surface is that "fresh" and clean oil is constantly forced into the narrow "center band" of the bearing surface, rather than permitting the possibility of the same oil film becoming "trapped" into a perpetual rotation around the bearing within that center band of lubrication activity, such that continued and severe demand on the oil film viscosity at that point prematurely breaks down and fails.

Figure 8:
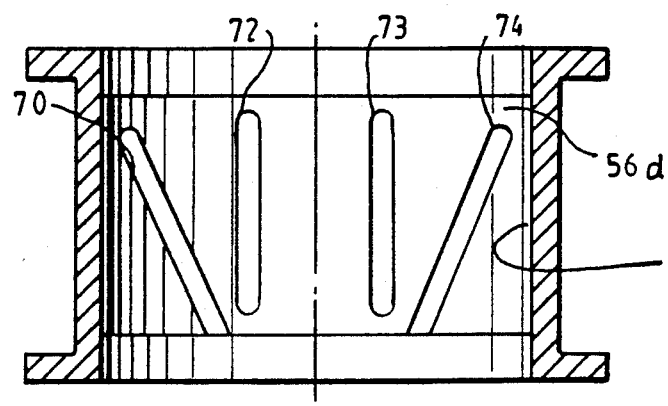
FIG. 8 is a top view of a fourth embodiment of the particular rear main bearing, within the main bearing set, which incorporates both the prior and new art into the present invention.

The rear main bearing 7 of the present invention involves inserting additional and perpendicular non-extended grooves 72 and 73, being one or more, in FIG. 8, to create a heretofore absent "oil containment" area, to be effectively an "irrigated field" of oil saturation, to further and critically lubricate the bearing surface 56d, and thereby reduce wear. FIG. 8 applies to each of the bearings 3, 4, 5, and 6, including the rear main bearing 7.

70 is the critical groove to remove and control the flow of excess oil and to act as a cleaning device to remove grit and debris from the bearing surface. 72 and 73 are oil containment puddles for additional and early lubrication. Groove 74 "brings back" oil to further lubricate the bearing 67c. Without 72 and 73, or 70 and 74, too much oil would be removed by 70 and the bearing would blister and fail.

The bottom-side position of grooves 72 and 73 also features new grooving, that does not extend to either edge of the rear main bearing 7. This prevents oil drainage from the bearing surface 56d when the internal combustion engine 1 is not running. This containment of oil on the bearing surface 56d establishes a permanent "reservoir" of oil to exist for "cold" start up protection, which oil activates onto the bearing surface 56d as soon as the crankshaft 2 begins to turn.

These "reservoirs" introduce the oil much quicker to each of the bearing surfaces 56a-d of bearings 3, 4, 5, 6, and 7, during the "cold start" phase of the internal combustion engine 1. After sitting cold, when an internal combustion engine 1 is first started up, it takes a moment for the oil to circulate around the bearing surface, all the way from the top. In the meantime, the crankshaft 2 is turning momentarily on a "dry" surface, which detriment is now eliminated by the present invention. The result is extended internal combustion engine life, reduced internal combustion engine "drag" and also reduced bearing "spin" from its seat.

These reservoirs also act as an oil cleaner, by providing an escape into which occasional small particles of grit from the oil may fall into; and be retained there, rather than to continue to spin on the bearing surface, and damage that metal face.

The rear main seals 8, are designed to arrest the escaping oil from the critical rear main bearing 7. The dilemma is that these seals 8 contact and expand and wear out, etc. The rear main bearing 7 of the present invention elongates the life of those rear main seals 8, by taking the oil pressure off from them by means of the angular grooving 70 and 74.

It will be understood that each of the elements described above, or two or more together, may also find a useful application in other types of constructions differing from the type described above.

While the invention has been illustrated and described as embodied in an automotive rear main bearing, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A main bearing for an internal combustion engine comprising:
   a) a metal alloy top half having a front edge, a back edge, an internal surface, a first end, and a second end;
   b) a metal alloy bottom half having a front edge, a back edge, an internal surface, a first end, and a second end, said bottom half of the bearing meeting said top half of the bearing so that said first end of said top half of the bearing joins said first end of the bottom half of said bearing and said second end of said top half of the bearing joins said second end of the bottom half of said bearing; and
   c) recess means disposed on said internal surface of said bottom half of the bearing so that oil can puddle there, capture debris, and prevent dry starts of the internal combustion engine, said recess means comprising:
      two straight recesses disposed on said internal surface of said bottom half of the bearing, parallel to said first and second ends, and ending prior to meeting said front edge of the bearing and said back edge of the bearing, and
      two straight recesses disposed at an angle to and meeting said front edge of the bearing and stopping prior to the back edge of the bearing and being disposed between said ends and being disposed on the outside of said two straight recesses, respectively.

* * * * *